Patented Mar. 13, 1928.

1,662,365

UNITED STATES PATENT OFFICE.

JACKSON D. COMSTOCK, OF CHESTER, WEST VIRGINIA.

METHOD OF TREATING RUBBER MOLDS.

No Drawing.   Application filed March 3, 1923.   Serial No. 622,677.

This invention is concerned with the manufacture of molded rubber articles and has for its object the provision of a method for treating the porous surfaces of metallic molds whereby the necessity for frequent cleaning thereof may be eliminated. More specifically, my invention is concerned with the provision of a process for finishing the molding surfaces of metallic molds whereby the releasing of the molded article therefrom may be greatly expedited and wherewith I may obtain molded articles which may be cured with highly glossed or lustrous surfaces.

Other objects of my invention will be hereinafter set forth in the following specification which discloses a method whereby I may obtain the desired result.

In the various industries devoted to the manufacture of molded rubber articles such as gloves, drug sundries, play balls, tires, etc., considerable difficulty has frequently been encountered in removing the cured, molded article from the mold, due to the adhering or sticking of the surfaces of the articles to the mold after the curing operation. In manufacturing the lighter articles such as hot water bottles, rubber gloves, etc., production losses have always occurred due to the sticking of the molded article to the mold, resulting in a tearing or destroying of the article when attempting to remove it from the mold. In the heavier articles such as rubber tires, loss of time in removing the tires from the molds has been an accepted necessity in the production thereof. The mold to which the particular article had adhered would have to be cleaned thoroughly before it would be possible to make further use thereof in subsequent curing operations. This necessitated the provision of extra molds to maintain uninterrupted production. To prevent this sticking of the cured articles to the molds, the use of powdered soapstone, mica, talc and the like has been resorted to, but the use of such expedients has introduced an added difficulty and that is, the accumulation of hard foreign matter upon the mold surfaces which occurs after several curing operations. The mold must therefore very frequently be taken out of production operation and be cleaned.

My invention contemplates treating the article defining surfaces of the mold cavity whereby the pores and interstices may be filled and a smooth surface may be presented to the rubber when being cured therein. If it is desired, this surface may have a high luster. Such molding surfaces may be obtained by various processes other than the process hereinafter disclosed. Some of the processes are the subject matter of co-pending applications. As an instance of some of these methods, the desired result may be obtained by coating the mold surfaces by a cumulative mold glossing process, that is, the pores of the mold may be filled gradually throughout a period covering a number of curing operations, the glazing or glossing material being introduced into the mold in the form of a lubricant which may leave a solid residue or deposit upon the mold surfaces which will fill the pores thereof and be highly glossed.

Another means involves the use of an oxy-acetylene glazing process whereby glass or other equivalent substance may be blown immediately upon the mold surfaces with a blow torch and glazed thereupon. It is also feasible to glaze the mold surfaces by the use of a porcelain coating process. The present disclosure however, is concerned primarily with obtaining the desired coating by the use of an enameling or painting and burning process.

Rubber molds are usually made by cutting cavities in either cast iron or steel blocks. If steel is used, the molding cavities thereof may be thoroughly cleaned before enameling by the use of any of the well-known hydro-carbon cleaning compounds such as benzol, benzine, and the like. If cast iron is used to make the molds, the cleaning of the molding surfaces thereof presents a more difficult problem, due to the porosity of the metal as the oil and grease used in the machining of the mold penetrates a considerable distance into the metal. The surplus foreign matter in the form of oil and grease and solid particles may be removed from the surfaces to be used with the usual cleaning compounds. The mold may then be subjected to a caustic cleaning process such as is used, for instance, in conditioning metal for electroplating and which comprises subjecting the mold to a concentrated caustic solution. Submersion of the mold for a period of a half hour or more, will result in the caustic solution penetrating into the metal a sufficient distance to dissolve any grease or foreign matter which may be present in the pores adjacent the molding surfaces thereof.

After removal from the caustic bath, the surfaces to be treated may be rubbed with a clean brush or steel wool and said surfaces may then be treated with a varnish or enamel having a baking temperature which is greater than the vulcanizing temperature of rubber compounds. Practically any varnish that contains a fairly high percentage of linseed oil will answer the purpose, an example being that generally sold under the name of "spar". These so called "spar" varnishes usually contain from 40 to 50 gallons of oil for every 100 pounds of gum. A thin solution of such varnish may be sprayed evenly upon the surfaces of the mold by an ordinary atomizer or spraying device. Such a solution should be sufficiently thin to permit of its penetration into the pores of the mold. A short air drying period will serve to permit the volatilization of part of the solvent and the mold may then be subjected to an enamel burning or baking temperature. Any metal coating varnish having a baking temperature ranging from 350 to 475 degrees Fahrenheit will be found to be useful and serviceable as a preliminary filler or coating and may be subjected to a preliminary baking temperature of about 300 to 350 degrees Fahrenheit, to eliminate the major portion of the volatile matter; the temperature of the mold being gradually raised to the baking temperature of the particular enamel or varnish being used. A protracted baking period of one or more hours will suffice to cause the enamel to be thoroughly solidified upon the mold surfaces.

A mold so treated will be found to have many advantages over the ordinary untreated or uncoated mold in that the releasing of the molded article from the mold is greatly facilitated. Liquid lubricant may be used in such a mold in place of the usual soapstone or chalk, thus facilitating the flowing of the rubber in the mold and the ready releasing thereof from the mold after the vulcanizing operation.

If it is desired to obtain a luster or glossy finish on the rubber article a second coating may be sprayed or painted with a brush upon the mold coated surfaces. This coating may comprise an enamel or varnish having heat resisting characteristics and including a solvent which may be completely volatilized at ordinary temperatures. If it is desired, however, to obtain a coating or surfacing having durable characteristics, a coating may be used which may be baked upon the first coating in the manner described. Such a coating, however, should have such characteristics, when hardened, that it may be dissolved or readily removed from the mold when it is eventually necessary to clean the mold and resurface it. An enamel which when dried or baked and which would be responsive to the dissolving action of a caustic solution would be preferable.

I may also coat the molding surfaces with a fine clay in the nature of a low temperature refractory, such as a porcelain clay, in which case the mold would be thoroughly cleaned in the manner described and a thin glaze applied thereto after which a proper burning of the clay will cause the clay to be vitrified or melted and flow into the pores and interstices of the mold surfaces. Such surfacing would have durable characteristics which would exceed those of the enamel coating described, but would have a disadvantage in that when it is desired to eventually clean the mold, it would be necessary to use extremely active dissolving acids to remove it from the mold surfaces which would require care to prevent deleterious effect upon the uncoated portions of the mold surfaces.

Many advantages result from the use of my process in treating rubber molds in that the rubber articles are readily released from the mold after being cured, and a very desirable finish is obtained on the rubber articles, in that the surfaces partake of the glossy characteristic of the coated molding surfaces, thus definitely bringing out the colors of the various rubber compounds used in forming the rubber articles. The necessity for frequent cleaning of the mold is eliminated and when it is eventually necessary to clean the mold, the mold may be thoroughly cleaned by the use of a caustic solution which will dissolve enamel, disposed between the foreign matter adhering to the mold and the mold walls. I thus eliminate the necessity for the use of a lubricant such as soapstone, mica, talc, and the like and eliminate the introduction of foreign matter into the mold, while obtaining a highly glossed surface on the molded article which brings out the true color of the various rubber compounds in use.

I claim:

1. The method of treating rubber molds, which includes the steps of treating the surfaces of the mold cavities of a metallic mold with a caustic cleaning solution, drying said mold, rubbing the surfaces thereof to remove dry foreign matter, spraying a thin solution of enamel upon said surfaces whereby the solution may fill the interstices and pores of the molding surfaces thereof, subjecting said mold to a baking temperature sufficient to harden the enamel, removing the mold from the heat influence, cooling the mold, treating the mold surfaces with a second coating of enamel, and rebaking the mold to cause said second coating to combine with the first coating.

2. The method of treating rubber molds which includes the steps of subjecting the molding surfaces of a metallic mold to the action of a caustic solution to remove oil and grease from the pores thereof, drying said mold, preparing a mixture of enamel and a volatilizing solvent, spraying said mixture upon the molding surfaces of the mold cavity whereby the pores thereof may be filled with said mixture, subjecting said mold when so treated to an enamel burning temperature, cooling the mold, recoating said cavities with a second coat of a heavier mixture of enamel and a high volatilizing solvent, drying said mold in ordinary air temperature, whereby the article molded thereby may be quickly and readily released from the mold cavity, and have the surfaces thereof partake of the characteristics of the finished surfaces of the mold cavity.

3. The method of treating rubber molds which includes the steps of subjecting the mold surfaces to a cleaning solution, drying the mold, coating the cleaned surfaces thereof with a solution of enamel and a volatilizing solvent, subjecting said mold to an enamel burning temperature, removing the mold from the heat influence, cooling the mold, recoating said surfaces with a second coating of enamel, and reburning the mold to cause said second coating of enamel to be hardened on the mold surfaces and effect the glossing thereof.

4. The method of surfacing rubber molds which includes the steps of treating the surfaces of the mold cavities of the metallic mold with a cleaning solution, drying said mold, subjecting said surfaces to a dry cleaning process, applying enamel upon said surfaces whereby enamel may fill the pores and interstices, subjecting said mold to an enamel baking temperature to harden the enamel, applying subsequent coatings of enamel, and rebaking the mold to cause said coatings to combine with previously baked coatings, whereby the molding surfaces may be glazed.

In testimony whereof, I hereunto affix my signature.

JACKSON D. COMSTOCK.